(12) United States Patent
Tsuchiya et al.

(10) Patent No.: US 8,323,844 B2
(45) Date of Patent: Dec. 4, 2012

(54) FUEL CELL OPERATION SYSTEM AND VALVE OPEN AMOUNT CALCULATION METHOD IN THE FUEL CELL OPERATION SYSTEM

(75) Inventors: Naohisa Tsuchiya, Toyota (JP); Yoshiaki Naganuma, Nisshin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 1240 days.

(21) Appl. No.: 12/084,906

(22) PCT Filed: Apr. 4, 2007

(86) PCT No.: PCT/JP2007/057930
§ 371 (c)(1),
(2), (4) Date: May 13, 2008

(87) PCT Pub. No.: WO2007/117015
PCT Pub. Date: Oct. 18, 2007

(65) Prior Publication Data
US 2009/0098426 A1 Apr. 16, 2009

(30) Foreign Application Priority Data

Apr. 7, 2006 (JP) .................................. 2006-106368

(51) Int. Cl.
*H01M 8/04* (2006.01)
(52) U.S. Cl. ...................................................... 429/446
(58) Field of Classification Search .................. None
See application file for complete search history.

(56) References Cited

U.S. PATENT DOCUMENTS 6,488,345 B1  12/2002  Woody et al.

FOREIGN PATENT DOCUMENTS

| DE | 11 2006 002 715 T2 | 9/2008 |
| JP | 2002-124278 A | 4/2002 |
| JP | 2003-180006 A | 6/2003 |
| JP | 2003-208911 A | 7/2003 |
| JP | 2004-172027 A | 6/2004 |
| JP | 2006-032151 A | 2/2006 |
| JP | 2006032151 A * | 2/2006 |
| WO | WO 2006056878 A2 * | 6/2006 |

OTHER PUBLICATIONS

Office Action issued Feb. 1, 2011 in Chinese Patent Application No. 200780012529.3 and English translation thereof.

* cited by examiner

*Primary Examiner* — Ula C Ruddock
*Assistant Examiner* — Daniel Gatewood
(74) *Attorney, Agent, or Firm* — Kenyon & Kenyon LLP

(57) ABSTRACT

FC current control in a fuel cell operation system can be roughly divided into two parts. The first part executes a total air feed amount calculation step, an FC air amount calculation step, and a bypass air amount calculation step. These steps are executed by using a stoichiometry map and a pumping hydrogen amount map. The second part calculates a control valve open amount instruction value and a bypass valve open amount instruction value according to the calculated FC air amount and the bypass air amount. Here, a control valve open amount map and the like are used. When generated power is output from the fuel cell stack by these instruction values, the actual FC current value is compared to the FC current instruction value and the control valve open amount is corrected according to a difference between them.

4 Claims, 5 Drawing Sheets

FUEL CELL OPERATION SYSTEM AND VALVE OPEN AMOUNT CALCULATION METHOD IN THE FUEL CELL OPERATION SYSTEM

This is a 371 national phase application of PCT/JP2007/057930 filed 4 Apr. 2007, claiming priority to Japanese Patent Application No. 2006-106368 filed 7 Apr. 2006, the contents of which are incorporated herein by reference.

FIELD OF THE INVENTION

The present invention relates to a fuel cell operation system and a valve open amount calculation method in the fuel cell operation system, and in particular to a fuel cell operation system wherein a fuel cell using hydrogen as a fuel gas has at its cathode side a valve for adjusting the flow of an oxidizing gas, and a valve open amount calculation method in the fuel cell operation system.

BACKGROUND OF THE INVENTION

Fuel cell systems in which hydrogen is supplied to an anode side as a fuel gas and air is supplied to a cathode side as an oxidizing gas, in between of which is provided a membrane electrode assembly (MEA) comprised of stacked solid state electrolyte membrane and catalyst layers, are well known. In such a fuel cell operation system, electric power is generated by reaction of hydrogen and oxygen in the air within the cell which includes the MEA, and water, which is a reaction product, is discharged from the cathode side. In order to adjust the amount of air to be supplied to the cathode side, a back pressure valve or a control valve, known as a pressure regulating valve, is provided at the cathode side outlet of the fuel cell.

For example, Japanese Patent Publication JP 2003-180006 A discloses a regenerative braking system for use in fuel cell vehicles in which an expensive battery pack is not used, wherein a back pressure valve is provided between the cathode side outlet of the fuel cell and an atmospheric open end, and a bypass valve which is a three-way valve for bypassing to the atmospheric open end is provided between the cathode and a compressor which supplies compressed air. This publication further describes that during regenerative braking the back pressure valve is closed and the bypass valve is adjusted to regulate the compressor load of the air compressor, thereby generating an artificial loss to regulate regenerative torque.

The bypass valve described in the above-described JP 2003-180006 A is used to perform regenerative braking in a fuel cell which does not use a battery pack, which is a special case, whereas in other cases, a bypass valve is used to supply a diluent gas for diluting hydrogen gas for exhaustion to the atmosphere. More specifically, because the MEA is composed of stacked membranes, hydrogen may partially leak from the anode side to the cathode side, and this leaking hydrogen and unreacted hydrogen present at the anode side are diluted with air and discharged. For this purpose, a bypass valve divides air also serving as an oxidizing gas into a gas for reaction within a cell and a gas for dilution.

As described above, in a fuel operation system which uses hydrogen as a fuel gas, in addition to hydrogen gas supply and air supply, the generation of power, discharge of water as a reaction product, dilution of exhaust gas, and the like are regulated by the operation of several valves.

For such valves in a fuel cell operation system, on the basis of power generation and the like required of the fuel cell, detection results obtained by a pressure sensor and the like provided in a gas flow path are used to calculate valve open amount instructions to perform control.

However, the pressure sensor and the like may cease functioning at low temperatures. In such cases, it will be impossible to calculate valve open amount instructions.

An advantage of the present invention is to provide a fuel cell operation system which can calculate a valve open amount instruction without using a pressure sensor or the like, and a valve open amount calculation method in the fuel cell operation system.

SUMMARY OF INVENTION

According to one aspect of the present invention, there is provided a fuel cell operation system comprising a fuel cell; a fuel gas supply device that supplies a fuel gas to an anode side of the fuel cell; an oxidizing gas supply device that supplies an oxidizing gas to a cathode side of the fuel cell; an inlet side flow path that connects between the oxidizing gas supply device and a cathode side gas inlet of the fuel cell; an outlet side flow path connected from a cathode side gas outlet of the fuel cell to an exhaust side; a bypass flow path that connects between the inlet side flow path and the outlet side flow path and is arranged in parallel with the fuel cell; a control valve provided in at least one of the inlet side flow path and the outlet side flow path to adjust a gas flow rate at the cathode side; a bypass valve provided in the bypass flow path to adjust a gas flow rate in the bypass flow path; and a control unit that controls operation of the fuel cell, wherein the control unit comprises an obtaining part to obtain a bypass valve differential pressure which is a differential pressure between upstream and downstream of the bypass valve by applying an open amount of the bypass valve and the gas flow rate in the bypass flow path to pre-obtained flow characteristics of the bypass valve; and an obtaining part to obtain an open amount of the control valve by applying the bypass valve differential pressure and the cathode side gas flow rate to both characteristics of pre-obtained cathode side flow characteristics of the fuel cell and flow characteristics of the control valve.

Further, according to another aspect of the present invention, it is preferable that, in the fuel cell operation system, the fuel gas is hydrogen; and the control unit further comprises an obtaining part to obtain a pumping hydrogen amount for the cathode side within the fuel cell based on an output power required of the fuel cell; an obtaining part to obtain a gas flow rate at which gas is supplied to the cathode side gas inlet based on the output power required of the fuel cell; and an obtaining part to obtain a gas flow rate at which gas is passed through the bypass flow path based on the obtained pumping hydrogen amount.

Further, according to still another aspect of the present invention, it is preferable that, in the fuel cell operation system, the control unit further comprises an obtaining part to obtain an unreacted hydrogen flow rate which is an unreacted fuel gas flow rate at the anode side; and the obtaining part to obtain a gas flow rate at which gas is passed through the bypass flow path comprises obtaining a gas flow rate at which gas is passed through the bypass flow path based on the pumping hydrogen amount and the unreacted hydrogen flow rate at the anode side.

Further, according to still another aspect of the present invention, it is preferable that, in the fuel cell operation system, the control unit further comprises a correcting part to correct the open amount of the control valve based on a difference between an actual generated power output from the fuel cell which is operated under the obtained open amount of the control valve and the output power required of the fuel cell.

Further, according to still another aspect of the present invention, it is preferable that, in the fuel cell operation system, the obtaining part to obtain a pumping hydrogen amount comprises obtaining a pumping hydrogen amount based on a current value of the fuel cell and a stoichiometry value which is an increase coefficient with respect to an amount of air theoretically necessary for an electrochemical reaction in the fuel cell.

Further, according to still another aspect of the present invention, there is provided a valve open amount calculation method for a fuel cell operation system, the fuel cell operation system comprising a fuel cell; a fuel gas supply device that supplies a fuel gas to an anode side of the fuel cell; an oxidizing gas supply device that supplies an oxidizing gas to a cathode side of the fuel cell; an inlet side flow path that connects between the oxidizing gas supply device and a cathode side gas inlet of the fuel cell; an outlet side flow path connected from a cathode side gas outlet of the fuel cell to an exhaust side; a bypass flow path that connects between the inlet side flow path and the outlet side flow path and is arranged in parallel with the fuel cell; a control valve provided in at least one of the inlet side flow path and the outlet side flow path to adjust a gas flow rate at the cathode side; a bypass valve provided in the bypass flow path to adjust a gas flow rate in the bypass flow path; and a control unit that controls operation of the fuel cell, wherein the fuel gas is hydrogen; and the method comprises the steps of obtaining a pumping hydrogen amount for the cathode side within the fuel cell based on an output power required of the fuel cell; obtaining a gas flow rate at which gas is supplied to the cathode side gas inlet based on the output power required of the fuel cell; obtaining a gas flow rate at which gas is passed through the bypass flow path based on the obtained pumping hydrogen amount; obtaining a bypass valve differential pressure which is a differential pressure between upstream and downstream of the bypass valve by applying an open amount of the bypass valve and the gas flow rate in the bypass flow path to pre-obtained flow characteristics of the bypass valve; and obtaining an open amount of the control valve by applying the bypass valve differential pressure and the cathode side gas flow rate to both characteristics of pre-obtained cathode side flow characteristics of the fuel cell and flow characteristics of the control valve.

Further, according to still another aspect of the present invention, it is preferable that, in the valve open amount calculation method for the fuel cell operation system, the method further comprises the step of obtaining an undreacted hydrogen flow rate which is an unreacted fuel gas flow rate at the anode side, wherein the step of obtaining a gas flow rate at which gas is passed through the bypass flow path comprises obtaining a gas flow rate at which gas is passed through the bypass flow path based on the pumping hydrogen amount and the unreacted hydrogen flow rate at the anode side.

Further, according to still another aspect of the present invention, it is preferable that, in the valve open amount calculation method for the fuel cell operation system, the step of obtaining a pumping hydrogen amount comprises obtaining a pumping hydrogen amount based on a current value of the fuel cell and a stoichiometry value which is an increase coefficient with respect to an amount of air theoretically necessary for an electrochemical reaction in the fuel cell.

Having the above-described structure, the fuel cell operation system has, at the cathode side, a control valve which is provided in at least one of the inlet side flow path and the outlet side flow path, and a bypass valve which is provided in parallel with the fuel cell to connect between the inlet side flow path and the outlet side flow path. Further, by applying the open amount of the bypass valve and the gas flow rate in the bypass flow path to pre-obtained flow characteristics of the bypass valve, a bypass valve differential pressure which is a differential pressure between upstream and downstream of the bypass valve is obtained; and, by applying the bypass valve differential pressure and the cathode side gas flow rate to both characteristics of pre-obtained cathode side flow characteristics of the fuel cell and flow characteristics of the control valve, an open amount of the control valve is obtained. Therefore, it is possible to obtain a valve open amount instruction without using a pressure sensor or the like.

To apply a gas flow rate and the like to pre-obtained characteristics, the characteristics may be expressed in the form of a computational expression to calculate an open amount of the control valve or the like by inputting a gas flow rate and the like to output its result, or, alternatively, the characteristics may also be expressed in the form of a look-up table from which an open amount of the control valve or the like is read and acquired by inputting a gas flow rate and the like. Further, these conversion forms may be stored in a ROM or the like, and by using a gas flow rate and the like as inputs, an open amount of the control valve or the like may be acquired as an output.

Further, hydrogen is used as the fuel gas; a pumping hydrogen amount for the cathode side within the fuel cell is obtained based on an output power required of the fuel cell; a gas flow rate at which gas is supplied to the cathode side gas inlet is obtained based on the output power required of the fuel cell; and a gas flow rate at which gas is passed through the bypass flow path for hydrogen dilution is obtained based on the obtained cross leak pumping hydrogen amount. Therefore, it is also possible to obtain a bypass gas flow rate, which is to be input to the characteristics of the bypass valve, without using a pressure sensor or the like. Also, in regard to the manner in which these are obtained, a desired output value may be calculated by applying input data to the form of a computational expression; output data corresponding to input data may be acquired by using the form of a look-up table; or input data may be converted to desired output data by using a ROM or the like.

Further, hydrogen is used as the fuel gas, and because a gas flow rate at which gas is passed through the bypass flow path is obtained based on the hydrogen pumping amount and the unreacted hydrogen flow rate at the anode side, it is also possible to obtain, without using a pressure sensor or the like, a bypass gas flow rate for diluting both of the pumping hydrogen and gas which is discharged as unreacted hydrogen at the anode side.

Further, because the open amount of the control valve is corrected based on a difference between an actual generated power output from the fuel cell which is operated under the obtained open amount of the control valve and the output power required of the fuel cell, it is possible to apply feedback to correct any deviation in the valve open amount.

Further, because the pumping hydrogen amount is obtained based on a current value of the fuel cell and a stoichiometry value which is an increase coefficient with respect to an amount of air theoretically necessary for an electrochemical reaction in the fuel cell, it is also possible to obtain the pumping hydrogen amount without using a pressure sensor or the like.

DETAILED DESCRIPTION

Figure 1:
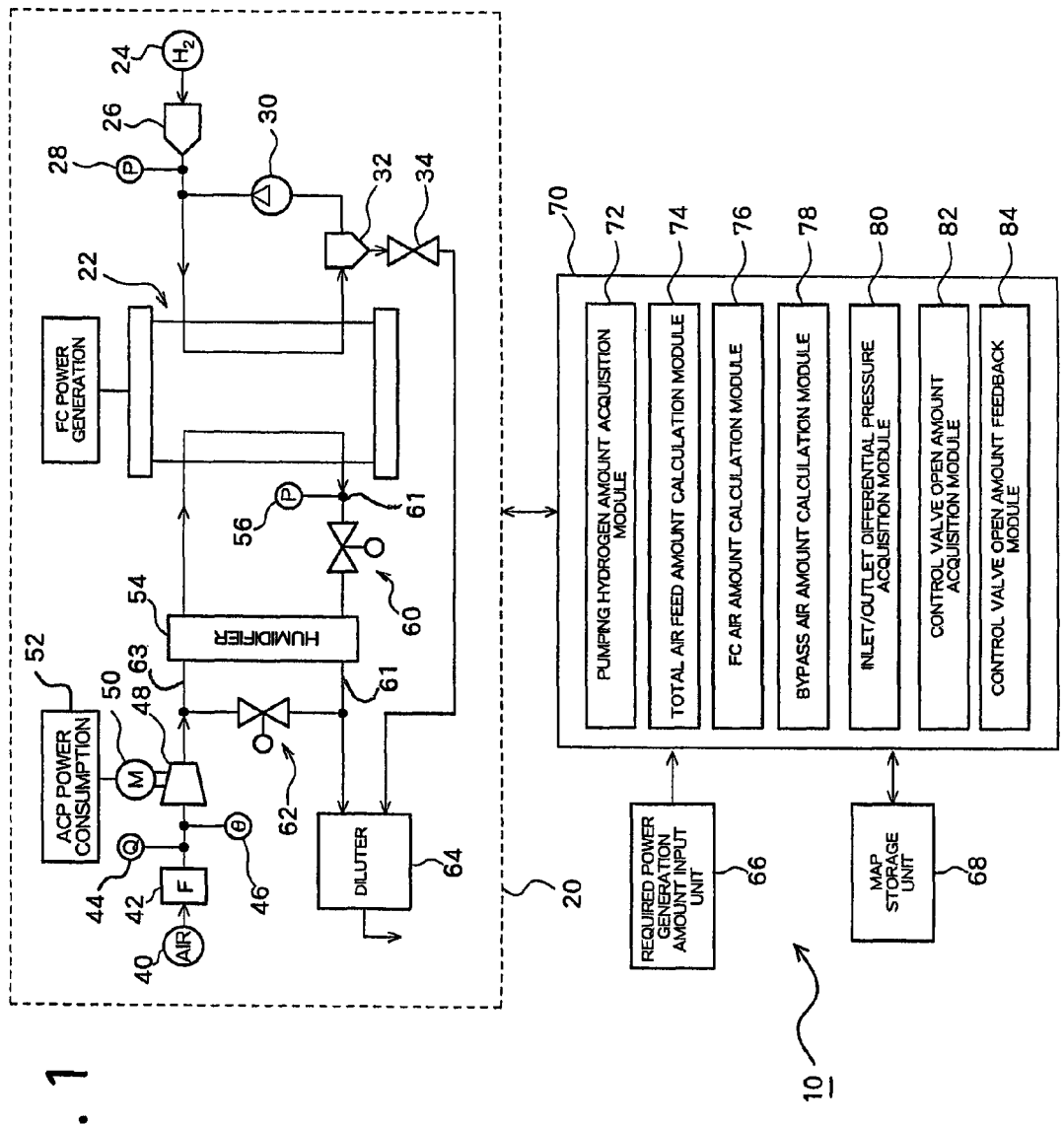
FIG. 1 is a schematic diagram of a fuel cell operation system according to an embodiment of the present invention.

An embodiment of the present invention will be described in detail below with reference to the drawings. FIG. 1 is a schematic diagram of a fuel cell operation system 10. The fuel cell operation system 10 includes a system main unit 20, a control unit 70 which controls components of the system main unit 20 throughout the entire system, a required power generation amount input unit 66 which designates the amount of power generated by the fuel cell, and a map storage unit 68 which stores a data conversion map to be used by the control unit 70.

The system main unit 20 includes a fuel cell main body, referred to as a fuel cell stack 22, in which a plurality of fuel cells are stacked, and components arranged at the anode side of the fuel cell stack 22 for supplying a hydrogen gas which is a fuel gas and components arranged at the cathode side for supplying air which is an oxidizing gas.

A fuel gas supply source 24 at the anode side is a tank for supplying hydrogen as a fuel gas. The fuel gas supply source 24 is connected to a regulator 26. The regulator 26 has the function of regulating the hydrogen gas supplied from the fuel gas supply source 24 to be at an appropriate pressure and flow rate. A pressure indicator 28 provided at an output port of the regulator 26 is a measurement device for detecting the pressure of the supplied hydrogen. The output port of the regulator 26 is connected to an anode side inlet of the fuel cell stack 22, and the hydrogen gas regulated at an appropriate pressure and flow rate is supplied to the fuel cell stack 22.

The gas discharged from an anode side outlet of the fuel cell stack 22 contains a reduced concentration of hydrogen because hydrogen is consumed for power generation, and contains an increased concentration of impurity gas because a nitrogen gas which is a component of air at the cathode side passes through the MEA. In addition, water which is a reaction product also passes through the MEA.

A flow divider 32 which is connected to the anode side outlet of the fuel cell stack 22 is provided to allow the gas to flow through an exhaust valve 34 to a diluter 64 when the concentration of impurity gas in the gas discharged from the anode side outlet becomes high. This exhaust gas is a hydrogen gas which contains, in addition to nitrogen, water as a reaction product. In addition, a circulation booster 30 which is provided downstream of the flow divider 32 and between the flow divider 32 and the anode side inlet is a hydrogen pump having the function of increasing the hydrogen partial pressure in the gas returning from the anode side outlet to recycle the gas to the anode side inlet for reuse.

As an oxidizing gas supply source 40 at the cathode side, the atmosphere can be used in practical applications. The atmosphere (air) serving as the oxidizing gas supply source 40 is supplied to the cathode side through a filter 42. A flow indicator 44 which is provided downstream of the filter 42 is a flowmeter for detecting the total quantity of flow supplied from the oxidizing gas supply source 40. In addition, a thermometer 46 which is provided downstream of the filter 42 has the function of detecting the temperature of the gas supplied from the oxygen gas supply source 40.

An air compressor (ACP) 48 is a gas booster which employs a motor 50 to compress the volume of air, which is the oxidizing gas, to increase the pressure of the gas. The ACP (48) has a feature that its rotational speed (revolutions per minute) can be varied under control of the control unit 70 in order to provide a predetermined amount of oxidizing gas. More specifically, the rotational speed of the motor 50 is increased when the required flow rate of the oxidizing gas is high, and, on the other hand, the rotational speed of the motor 50 is decreased when the required flow rate of the oxidizing gas is low. An ACP power consumption detection unit 52 is a measurement device having the function of detecting the power consumption of the ACP (48), or more specifically, the power consumption of the motor 50. Because the motor 50 consumes more power when the rotational speed is increased, and consumes less power when the rotational speed is decreased, the power consumption is closely related to the rotational speed of the motor, or the flow rate of the oxidizing gas.

In this manner, air serving as the oxidizing gas is supplied to the cathode side of the fuel cell stack 22 by means of the ACP (48) under control of the control unit 70. More specifically, the terms "oxidizing gas" and "air" as used herein are synonymous. Therefore, the components from the oxidizing gas supply source 40 to the ACP (48) can be referred to as an oxidizing gas supply device.

A humidifier 54 has the function of appropriately humidifying the oxidizing gas to enable the fuel cell stack 22 to perform a fuel cell reaction efficiently. The oxidizing gas which is appropriately humidified by the humidifier 54 is supplied to a cathode side inlet of the fuel cell stack 22, and is exhausted from a cathode side outlet. Here, in addition to the exhaust air, water, which is a reaction product, is also discharged. Because the reaction in the fuel cell stack 22 heats it to high temperatures, the discharged water is in the form of water vapor, and this water vapor is supplied to the humidifier 54 for appropriately humidifying the oxidizing gas. As described, the humidifier 54 has the function of suitably providing moisture in the water vapor to the oxidizing gas, and a gas exchanger which uses hollow fibers can be used. More specifically, the humidifier 54 is configured to be capable of gas exchange between a flow path through which the gas supplied from the ACP (48) flows and a flow path through which the water vapor flows. For example, by using an inner flow path of a hollow fiber as the flow path for the oxidizing gas supplied from the ACP (48) and using an outer flow path of the hollow fiber for the water vapor flowing from the cathode side outlet of the fuel cell stack 22, it is possible to appropriately humidify the oxidizing gas to be supplied to the cathode side inlet of the fuel cell stack 22.

Here, a flow path 63 connecting between the above-described oxidizing gas supply device and the cathode side inlet of the fuel cell stack 22 can be referred to as an inlet side flow path. Correspondingly, a flow path 61 connected from the cathode side outlet of the fuel cell stack 22 to the exhaust side can be referred to as an outlet side flow path.

A pressure indicator 56 provided at the cathode side outlet of the outlet side flow path has the function of detecting the gas pressure at the cathode side outlet. Further, a control valve 60 provided in the outlet side flow path is also called a back pressure valve, and is a valve having the function of adjusting the gas pressure at the cathode side outlet to adjust the flow rate of the oxidizing gas to the fuel cell stack 22; for example, a valve which can adjust the effective orifice of the flow path, such as a butterfly valve, can be used. It should be noted that, in some cases, the control valve 60 may be provided in the inlet side flow path.

Because an output port of the control valve 60 is connected to the above-described humidifier 54, the gas leaving from the control valve 60 supplies water vapor to the humidifier 54, and then returns again to enter the diluter 64, and is subsequently discharged to the outside.

A bypass valve 62 is a valve provided in a bypass flow path arranged in parallel with the fuel cell stack 22 and connecting between the inlet side flow path and the outlet side flow path, and mainly has the function of supplying, to the diluter 64, air for diluting the hydrogen concentration in the exhaust. More specifically, by opening the bypass valve 62, the oxidizing gas supplied from the ACP (48), aside from a component flowing to the fuel cell stack 22, can be supplied to the diluter 64 by way of the bypass flow path bypassing the fuel cell stack 22. As the bypass valve 62, a valve having a similar structure to that of an exhaust bypass valve used for engine exhaust gas dilution can be used.

The diluter 64 is a buffer tank for collecting water containing waste hydrogen which comes from the exhaust valve 34 for the anode side, and exhaust gas containing water vapor and further containing hydrogen which leaks through the MEA for the cathode side, for discharge to the outside at an appropriate hydrogen concentration. When the hydrogen concentration exceeds an appropriate level, by opening the bypass valve 62, the gas can be appropriately diluted using an oxidizing gas provided without passing through the fuel cell stack 22.

The control unit 70 controls the above-described components of the system main unit 20 throughout the entire system, and is sometimes referred to as a "fuel cell CPU". The control unit 70 in particular has the function for obtaining a valve open amount instruction in accordance with the operation conditions of the fuel cell. The control valve 60 and the bypass valve 62 are provided for the cathode side of the fuel cell operation system 10, and, as preconditions for obtaining open amounts of these valves, the total amount of the oxidizing gas (air) supplied from the ACP (48) is referred to as a total air feed amount, and the total air feed amount is distributed as an FC air amount which is supplied to the cathode side of the fuel cell stack 22 and a bypass air amount which is fed through the bypass flow path. Open amount instructions for the control valve 60 and the bypass valve 62 are obtained in accordance with the FC air amount and the bypass air amount.

More specifically, in order to obtain valve open amount instructions, the control unit 70 includes a pumping hydrogen amount acquisition module 72 which obtains a pumping hydrogen amount for the cathode side, a total air feed amount calculation module 74 which obtains a total air feed amount, an FC air amount calculation module 76, a bypass air amount calculation module 78, an inlet/outlet differential pressure acquisition module 80 which obtains a pressure difference between both sides of the bypass valve 62, a control valve open amount acquisition module 82 which obtains an open amount of the control valve and the like, and a control valve open amount feedback module 84 which feeds the amount of FC power generation back to the open amount of the control valve for correction of the open amount of the control valve. These functions can be implemented by software, and specifically can be implemented by executing a corresponding fuel cell operation program, or a valve freeze prevention program included therein. These functions may be partially implemented by hardware.

It should be noted that the reason that different expressions such as calculation and acquisition are used here for the functions of obtaining desired data is to distinguish between a function of calculating a desired value through computation and a function of acquiring a desired value by converting input data into output data using a characteristic map from the map storage unit 68 as will be described below.

The required power generation amount input unit 66 has the function of inputting, to the fuel cell operation system 10, a setting value to determine how much FC power should be generated. Specifically, it is possible to use a keyboard or other manual input means, or, in a fuel cell operation system for a vehicle or the like, it is also possible to use receiver an instruction from a vehicle operation control unit which is not shown in the drawing. In the latter case, a required power generation amount is automatically transmitted from the vehicle operation control unit to the required power generation amount input unit 66 in accordance with operation conditions of the vehicle.

The map storage unit 68 is a storage device for storing a map necessary for executing the valve open amount obtaining function of the control unit 70, and can be formed of a semiconductor memory or the like. The map refers to a representation of characteristics which are expressed in a predetermined functional relationship using a plurality of variables in the form of a look-up table or other expression form, from which, when a variable is used as input data, its corresponding characteristic value can be read as output data. As described, a map is one kind of conversion means for conversion from input data into output data. Therefore, any other expression form other than a look-up table may be used, and, for example, characteristics may be expressed in the form of a computational expression so that, when a variable is used as input data, its corresponding characteristic value can be output. The map storage unit 68 can be formed in the form of, for example, a ROM table.

The map storage unit 68 stores a plurality of maps. A first map is a stoichiometry map for air amounts. The stoichiometry map refers to a representation of how much an increase practically should be with respect to a theoretically necessary amount of air which is theoretically necessary for reaction in a fuel cell, which is expressed using a temperature of the fuel cell, FC power generation, and, more specifically, an FC current as variables in the form of a coefficient table.

A second map is a pumping hydrogen amount map. The pumping hydrogen amount map refers to a representation of hydrogen amounts at the cathode side in a fuel cell reaction, which are expressed using an FC current as a variable in the form of a table.

A third map is a control valve open amount map. The control valve open amount map refers to a representation of open amount instruction values for the control valve, which are expressed using an FC air amount and an inlet/outlet differential pressure as variables in the form of a table. The inlet/outlet differential pressure as used herein refers to a difference between the gas pressure at the cathode side inlet of the fuel cell stack 22 and the gas pressure at the cathode side outlet. Because, as explained with reference to FIG. 1, the bypass valve 62 is arranged in parallel with the cathode side inlet and outlet of the fuel cell stack 22, the inlet/outlet differential pressure as used here can be considered to be identical to a bypass valve differential pressure which is a pressure difference between upstream and downstream of the bypass valve 62. In the following description, the inlet/outlet differential pressure will be described without distinguishing between the bypass valve differential pressure and the differential pressure between the inlet and outlet at the cathode side of the fuel cell stack 22. The details of content of the maps will be described in the explanation of operation of the fuel cell system.

Figure 2:
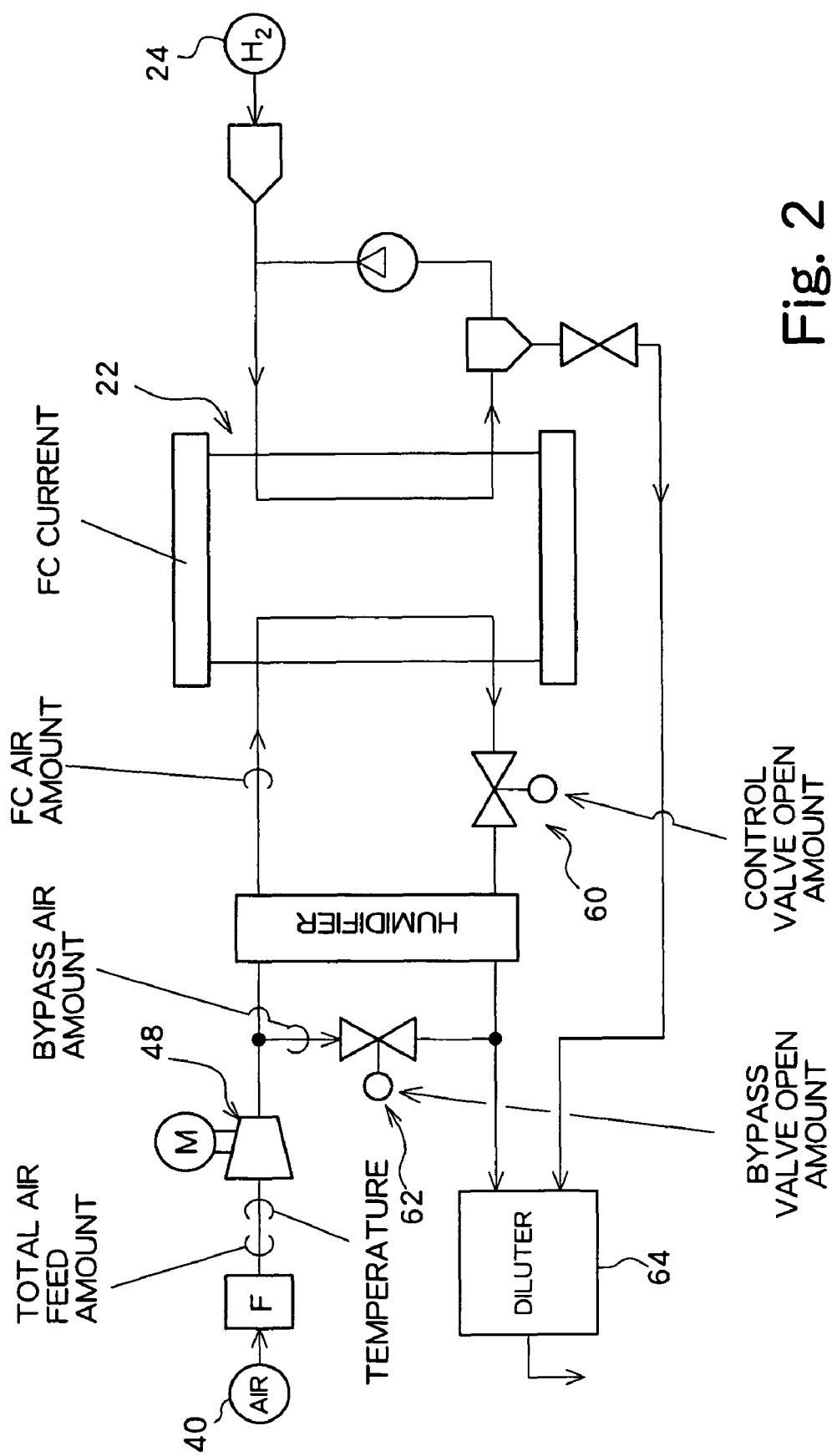
FIG. 2 is a diagram showing the relationship between air amounts, valve open amounts, and the like according to the embodiment of the present invention.
Figure 3:
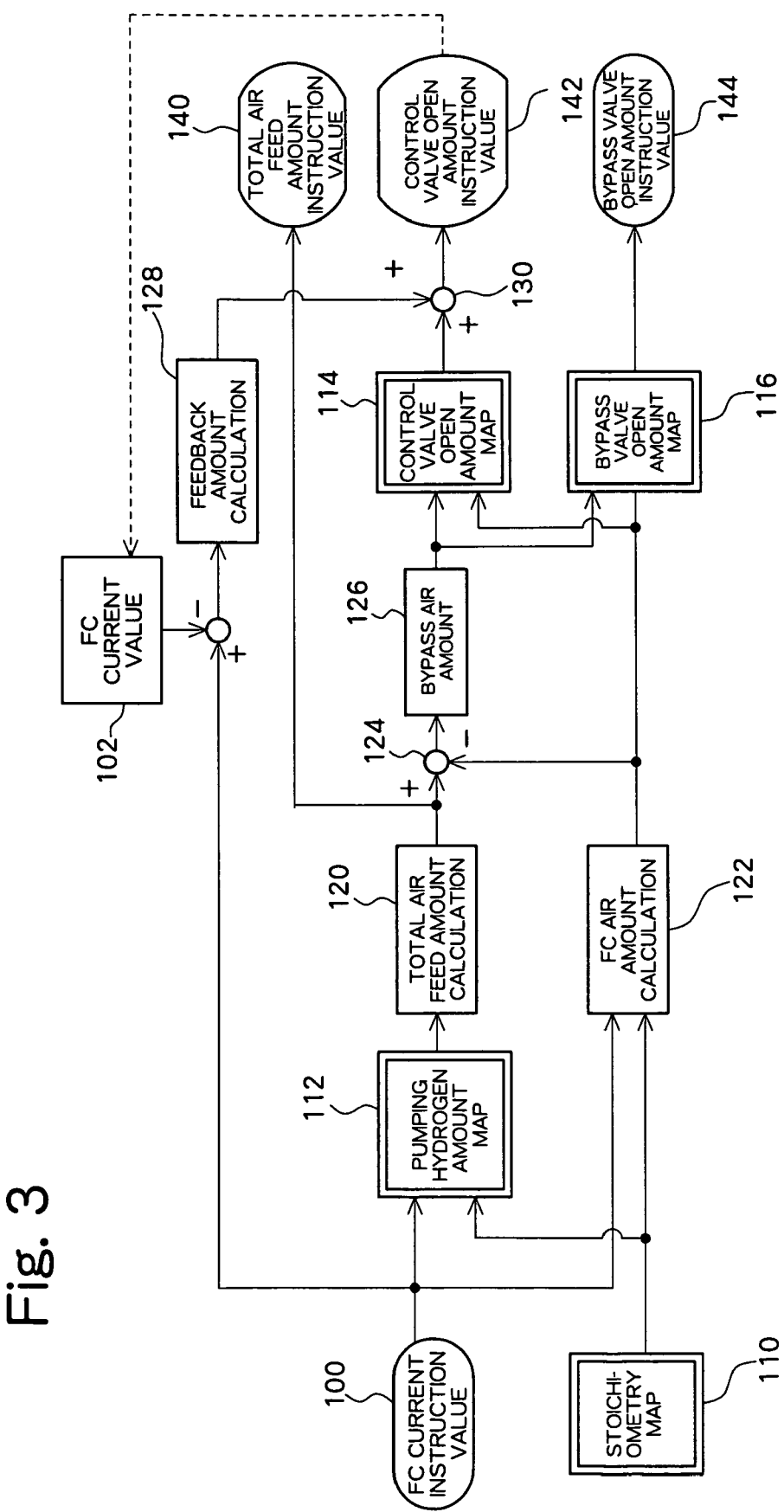
FIG. 3 is a block diagram concerning FC current control according to the embodiment of the present invention.
Figure 4:
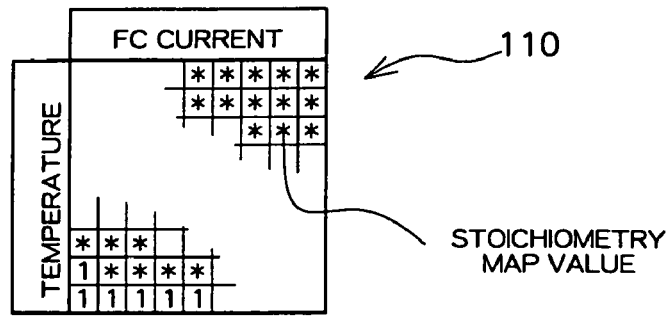
FIG. 4 is a diagram illustrating a stoichiometry map according to the embodiment of the present invention.
Figure 5A:
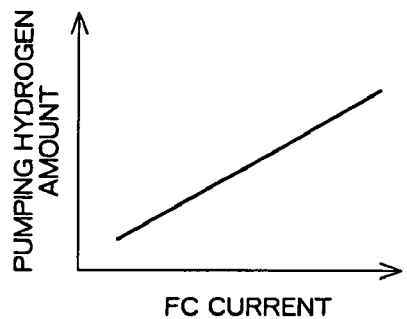
FIG. 5A is a diagram illustrating a pumping hydrogen amount map according to the embodiment of the present invention.
Figure 5B:
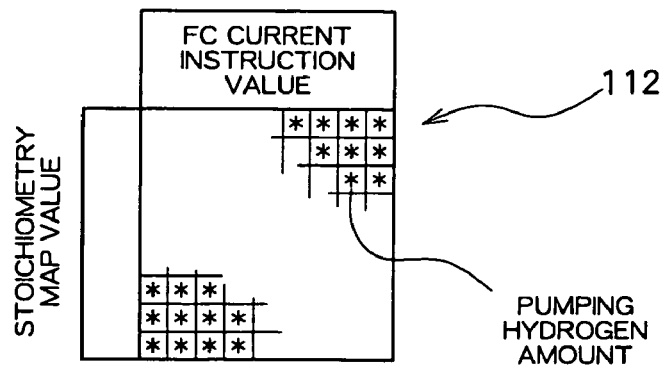
FIG. 5B is another diagram illustrating a pumping hydrogen amount map according to the embodiment of the present invention.

Operation of the fuel cell operation system 10 having the above-described structure, and, in particular, the functions of the control unit 70 will be described in detail with reference to FIGS. 2 through 7. FIG. 2 is a diagram showing the relationship between a total air feed amount, an FC air amount, a bypass air amount, a control valve open amount, a bypass valve open amount, a temperature of the fuel cell, and an FC current in the fuel cell operation system 10. FIG. 3 is a block diagram concerning FC current control in the fuel cell operation system 10. FIG. 4 is a diagram illustrating a map concerning stoichiometry map values, FIG. 5 is a diagram illustrating a map concerning pumping hydrogen amounts, and FIG. 6 is a diagram illustrating a map concerning control valve open amounts. FIG. 7 is a diagram illustrating turning the bypass valve to its fully open position with respect to the bypass valve open amount.

FIG. 2 is a simplified form of the schematic diagram shown in FIG. 1 in which components used in FIG. 3 are shown. As shown here, a total amount of compressed air supplied through the ACP (48) is the total air feed amount, and an amount supplied to the cathode side of the fuel cell stack 22 from the total air feed amount is the FC air amount. The partial amount of the total air feed amount which flows by way of the bypass valve 62 is the bypass air amount. Therefore, the total air feed amount equals the FC air amount plus the bypass air amount. The control valve open amount is an open amount instruction value for the control valve 60, and the bypass valve open amount is an open amount instruction value for the bypass valve 62. A generated current obtained from the fuel cell stack 22 by a fuel cell reaction is the FC current. It should be noted that the temperature of the fuel cell is given as the temperature of air supplied to the ACP (48).

FIG. 3 shows a block diagram of FC current control in the fuel cell operation system 10. Here, the diagram shows that two control methods are used. The first is a so-called "open-loop feedforward control" in which, when an FC current instruction value 100 is given as an input instruction value, a total air feed amount instruction value 140, a control valve open amount instruction value 142, and a bypass valve open amount instruction value 144 are output as output instruction values, which are respectively supplied to the ACP (48), the control valve 60, and the bypass valve 62. The second is feedback control in which an FC current value 102 obtained as a result of the above-described feedforward control is compared with the FC current instruction value 100, and their difference is fed back to the control valve open amount using PI control. Because, as will be described below, it is preferable that the bypass valve open amount is a full open amount, the control block diagram in FIG. 3 substantially shows control of the control valve open amount in case of that the bypass valve open amount is a full open amount.

FIG. 3 can be roughly divided into two parts. The first part is a part for executing a total air feed amount calculation step 120, an FC air amount calculation step 122, and a bypass air amount calculation step 126. The second part is a part for obtaining the control valve open amount instruction value 142, the bypass valve open amount instruction value 144, and the like, based on the calculated FC air amount and bypass air amount. A procedure for obtaining a control valve open amount instruction value and the like will be described below with reference to FIG. 3.

First, an FC current instruction value 100 is given as input data. The FC current instruction value 100 is an instruction value for a current to be generated which is to be generated in the fuel cell stack 22 and output therefrom, and corresponds to a power generation target value. The FC current instruction value 100 is manually input through the required power generation amount input unit 66, or is acquired by automatically receiving data which is transmitted in accordance with the operation conditions of a target to which power is supplied from the fuel cell operation system 10, such as a vehicle or the like.

When the FC current instruction value 100 is given, a pumping hydrogen amount is acquired using a stoichiometry map 110 and a pumping hydrogen amount map 112. Specifically, by the function of the pumping hydrogen amount acquisition module 72 of the control unit 70, when the FC current instruction value 100 is given, a pumping hydrogen amount is acquired by searching the map storage unit 68 and then employing the appropriate map.

FIG. 4 is a diagram showing an example of a stoichiometry map. The stoichiometry map 110 is a table from which a stoichiometry map value is read based on two input data items. The two input data items are the FC current and the temperature of the fuel cell. Therefore, by using the FC current instruction value as data for the FC current; using a temperature of air supplied to the ACP (48), which is detected by the thermometer 46, as the temperature of the fuel cell; and referring to the stoichiometry map 110, the stoichiometry map value for that (FC current, temperature) can be acquired. The stoichiometry map value is an increase coefficient with respect to the theoretically necessary air amount. As shown in FIG. 4, when the FC current is small and the temperature is low, the stoichiometry map value often assumes 1.

FIG. 5 is a diagram illustrating the pumping hydrogen amount map 112. The pumping hydrogen refers to hydrogen which leaks to the cathode side, and its amount is related to the FC current; it is known that the greater the FC current the more the pumping hydrogen amount is increased, and its relational expression is experimentally obtained. FIG. 5($a$) is a diagram showing an example of the relational expression. Because the FC current is determined based on output power required of the fuel cell, the pumping hydrogen amount can be obtained, as will be described below, based on a required output power acquired through the required power generation amount input unit 66.

The pumping hydrogen amount map 112 is shown in FIG. 5($b$) and is a table from which the pumping hydrogen amount is read based on two input data items. The two input data items are the FC current instruction value and the stoichiometry map value. The pumping hydrogen amount map 112 can be created on the basis of the experimental relational expression illustrated in FIG. 5($a$) by substituting the FC current instruction value for the FC current value and additionally making corrections to the stoichiometry map value. Because the FC current instruction value and the stoichiometry map value are both already acquired, simply by reading the pumping hydrogen amount map 112, the pumping hydrogen amount under that FC current instruction value can be acquired. It should be noted that the pumping hydrogen amount is acquired in units of flow rates, such as, for example, NL/min (normal liters per minute).

Returning again to FIG. 3, when the pumping hydrogen amount is acquired, then the total air feed amount calculation step 120 is executed. Specifically, by the function of the total air feed amount calculation module 74, a necessary total air amount is calculated based on the pumping hydrogen amount, a target hydrogen concentration at which air should be exhausted, an amount of air to be consumed in the fuel cell stack 22, and the like. An amount of dilution air necessary for diluting the pumping hydrogen to be at the target hydrogen concentration is obtained based on the pumping hydrogen amount and the target hydrogen concentration, and this corresponds to the bypass air amount. Further, the amount of air to be consumed in the fuel cell stack 22 corresponds to the FC air amount. Therefore, the total air feed amount can be obtained by respectively calculating the bypass air amount and the FC air amount, and then summing these values.

In cases where the pumping hydrogen amount is large and therefore the bypass air amount is sufficiently large as compared with the FC air amount, such as in a low efficiency power generation mode, the total air feed amount can be calculated by a simpler method. More specifically, it is possible to use an equation in which the total air feed amount equals the pumping hydrogen amount multiplied by (100% divided by the target exhaust hydrogen concentration) multiplied by a safety factor. For the target exhaust hydrogen concentration, an experimentally obtained value can be used, and by setting the safety factor to be an adequate value which can accommodate an error in an approximate calculation, it is possible to easily obtain the total air feed amount as a safe value. The obtained total air feed amount is used, in that form, as the total air feed amount instruction value 140 for the ACP (48), and, in addition, is used in the subsequent process such as control valve open amount calculation or the like.

The FC air amount calculation step 122 is executed by the function of the FC air amount calculation module 76 by multiplying, by the stoichiometry map value, the amount of air to be consumed in the fuel cell stack 22. The amount of oxygen to be consumed in the fuel cell stack 22 can be theoretically obtained from the chemical reaction formula for the fuel cell by assigning the FC current value. From this, an FC oxygen consumption amount divided by the FC current value is obtained, and by dividing this by 0.21, which is the component ratio of oxygen contained in the air, it is possible to obtain an FC air consumption amount. The FC air amount is calculated by multiplying this FC air consumption amount by the stoichiometry map value. Therefore, when the FC current instruction value 100 is given, the FC air amount can be calculated using the stoichiometry map 110.

The bypass air amount calculation step 126 is executed by performing a subtraction process 124 on the total air feed amount obtained by the total air feed amount calculation step 120 and the FC air amount obtained by the FC air amount calculation step 122. More specifically, the subtraction process 124 performs a computation in which the bypass air amount equals the total air feed amount minus the FC air amount, to calculate the bypass air amount.

In this way, the total air feed amount, the FC air amount, and the bypass air amount are calculated, and then these are used to obtain the control valve open amount instruction value 142, the bypass valve open amount instruction value 144, and the like.

Because the control valve 60 and the bypass valve 62 both affect the pressure and flow rate of air to be supplied to the cathode side of the fuel cell stack 22, the control valve open amount instruction value 142 and the bypass valve open amount instruction value 144 are both obtained by balancing the FC air amount and the bypass air amount. More specifically, because the bypass valve 62 is arranged in parallel with the gas inlet and the gas outlet at the cathode side of the fuel cell stack 22, a pressure difference between both sides of the bypass valve 62 which determines the bypass air amount flowing through the bypass valve 62 is also a pressure difference between the gas inlet and the gas outlet at the cathode side of the fuel cell stack 22. On the other hand, the control valve 60 is provided for the gas outlet at the cathode side, and the flow rate at the outlet, or, in other words, the FC air amount, is determined depending on the pressure at the outlet and the open amount of the control valve 60. When the FC air amount and the bypass air amount are obtained in accordance with the above-described mutually dependent relationship, both of them are used to determine the open amount of the control valve 60 and the open amount of the bypass valve 62.

The control valve open amount instruction value 142 is obtained by a first step in which a control valve open amount is obtained using a control valve open amount map 114, and a second step in which corrections are made to this. In the first step, a control valve open amount is obtained using the control valve open amount map 114. FIG. 6 is a diagram illustrating the control valve open amount map 114.

Figure 6A:
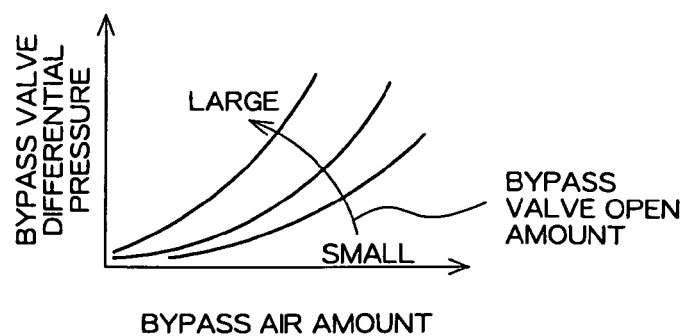
FIG. 6A is a diagram illustrating a bypass valve open amount map according to the embodiment of the present invention.
Figure 7:
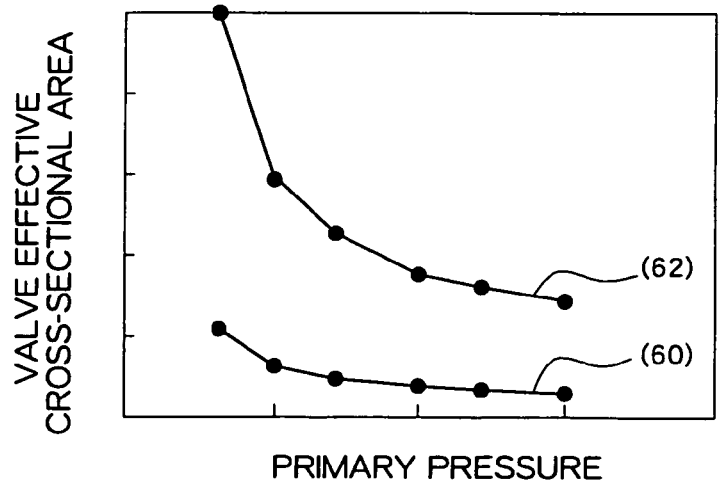
FIG. 7 is a diagram for illustrating turning a bypass valve to its fully open position with respect to the bypass valve open amount according to the embodiment of the present invention.

FIG. 6(a) is a diagram showing flow characteristics of the bypass valve 62, in which the horizontal axis represents the bypass air amount which is the amount of gas flowing through the bypass valve 62, and the vertical axis represents the inlet/outlet differential pressure which is the pressure difference between both sides of the bypass valve 62. A parameter is the open amount of the bypass valve 62. As shown in this diagram, when the bypass valve open amount and the bypass air amount are given, the inlet/outlet differential pressure of the bypass valve 62 is uniquely obtained.

Figure 6B:
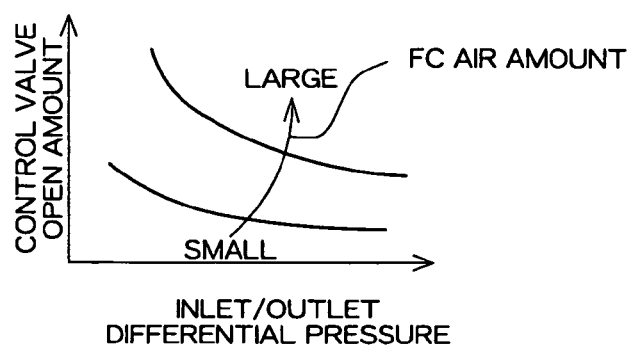
FIG. 6B is a diagram illustrating a control valve open amount map according to the embodiment of the present invention.

FIG. 6(b) is a diagram showing general flow characteristics of a part extending from the cathode side gas inlet of the fuel cell stack 22 to the outlet of the control valve 60. Here, general flow characteristic curves are shown with the horizontal axis representing the inlet/outlet differential pressure of the fuel cell stack 22 and the vertical axis representing the open amount of the control valve. A parameter is the FC air amount. As noted above, the general flow characteristics as used here are flow characteristics of the part extending from the cathode side gas inlet of the fuel cell stack 22 to the outlet of the control valve 60, and therefore are based on both characteristics of flow characteristics at the cathode side of the fuel cell and flow characteristics of the control valve 60. As can be seen from this diagram, by giving the FC air amount and the inlet/outlet differential pressure, the open amount of the control valve 60 is uniquely obtained. Here, as noted above, the inlet/outlet differential pressure of the fuel cell stack 22 is identical to the bypass valve differential pressure which is the differential pressure between upstream and downstream of the bypass valve 62.

Figure 6C:
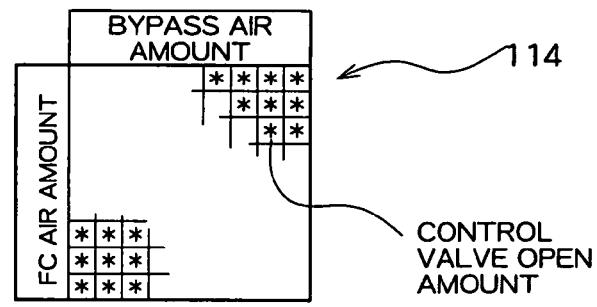
FIG. 6C is another diagram illustrating a control valve open amount map according to the embodiment of the present invention.

Therefore, it can be seen from FIGS. 6(a) and 6(b) that, when the open amount of the bypass valve, the bypass air amount, and the FC air amount are given, the open amount of the control valve 60 is uniquely obtained. In particular, when the bypass open amount is fixed, for example, at full open, the control valve open amount can be obtained from the bypass air amount and the FC air amount. FIG. 6(c) is a diagram showing an example of the control valve open amount map 114 for a case where the bypass valve open amount is set to be full open. The control valve open amount map 114 is a table from which the control valve open amount is read based on two input data items of the FC air amount and the bypass air amount. Even when the bypass valve open amount is not full open, the control valve open amount map can be created for each predetermined bypass valve open amount.

The control valve open amount thus acquired based on the FC air amount and the bypass air amount is supplied, as it is, as the control valve open amount instruction value 142 to a control valve drive mechanism which is not shown in the drawings, and the control valve 60 is driven in accordance with that instruction value to be set at a predetermined open amount.

Similarly to the control valve open amount map 114, a bypass valve open amount map 116 can also be created for each control valve open amount as a map for obtaining the bypass valve open amount based on two input data items of the FC air amount and the bypass air amount. The obtained bypass valve open amount is supplied to a bypass valve drive mechanism which is not shown in the drawings, and the bypass valve 62 is driven in accordance with that instruction value to be set at a predetermined open amount.

In particular, in cases where the bypass air amount is large as compared with the FC air amount, such as in a low efficiency power generation mode, it is suitable that the open amount of the bypass valve 62 be set full open, as will be explained with reference to FIG. 7.

FIG. 7 shows, by way of example, individual flow characteristics of the control valve 60 and the bypass valve 62, in which the air amount of the bypass valve 62 is set to be approximately five times the air amount of the control valve 60. The relationship between the primary pressures of the respective valves and the effective cross-sectional areas of the respective valves to satisfy the condition that the flow rates be constant, is shown in FIG. 7. Here, the primary pressures refer to pressures at gas inlet sides of the respective valves, and correspond to a delivery pressure of the ACP (48) as far as the bypass valve 62 shown in FIG. 1 is concerned. Further, the effective cross-sectional areas of the valves refer to cross-sectional areas through which air flows in a valve at a corresponding open amount, and are obtained by multiplying the full-open cross-sectional area of that valve by the open amount. It can be seen in the example shown in FIG. 7 that, in order to cause the air amount approximately five times the air amount flowing through the control valve 60 to flow through the bypass valve 62, when the primary pressures are the same, the effective cross-sectional area of the bypass valve 62 needs to be approximately five times the effective cross-sectional area of the control valve 60. In other words, the size of the bypass valve 62 is increased as compared with that of the control valve 60. Further, it can also be seen from FIG. 7 that, in order to reduce the size of the bypass valve 62, it is effective to increase the primary pressure. In other words, it is effective to increase the delivery pressure of the ACP (48).

As described above, when the bypass air amount is large as compared with the FC air amount, the bypass valve becomes larger in size. To prevent this, it is effective to increase the delivery pressure of the ACP (48), but there is a limit in doing so. Therefore, to prevent the increase in size of the bypass valve 62, it is effective to set the bypass valve 62 at full open while adjusting the bypass air amount and the FC air amount entirely by means of open amount adjustment of the control valve 60. In this case, the bypass valve open amount instruction value 144 is set at full open, and substantial FC current control is performed by varying the total air feed amount instruction value 140 and the control valve open amount instruction value 142.

In the manner described above, the total air feed amount instruction value 140, the control valve open amount instruction value 142, and the bypass valve open amount instruction value 144 are obtained, and then in accordance with these instruction values, the fuel cell operation system 10 controls the oxidizing gas, and the fuel cell stack 22 performs power generation reaction. When FC generated power is output from the fuel cell stack 22, its actual FC current value 102 is compared with the FC current instruction value 100 serving as a target value. Then, a feedback amount calculation step 128 is executed, in which a correction amount for the control valve open amount is calculated in accordance with a difference obtained as a result of the comparison. The calculated feedback amount is corrected to a value for the control valve open amount acquired using the control valve open amount map 114, which is updated as a new control valve open amount instruction value 142. Thus, at each appropriate feedback time, the control valve open amount is corrected, and the control valve open amount instruction value is updated.

As described above, when the FC current instruction value is given, it is possible to obtain the total air feed amount, the bypass air amount, and the FC air amount using pre-obtained characteristic maps, without using a pressure sensor or the like. Further, by pre-obtaining flow characteristics of the bypass valve and general flow characteristics of the fuel cell stack and the control valve, it is possible to obtain the control valve open amount instruction value in accordance with the open amount of the bypass valve using the characteristic maps. In particular, it is possible to obtain the control valve instruction value with the bypass valve open amount set at full open. Further, it is possible to compare an actual FC current value with the FC current instruction value to correct the control valve open amount on the basis of the difference. Thus, because it is possible to obtain the control valve open amount instruction even without using a pressure sensor or the like, the present invention is particularly effective when the fuel cell operates at low temperatures. Further, the present invention is more effective in a low efficiency power generation mode at low temperatures.

INDUSTRIAL APPLICABILITY

The present invention is used in a fuel cell operation system and a valve open amount calculation method for the fuel cell operation system. In particular, the present invention is used in a fuel cell operation system having a valve for adjusting the flow of an oxidizing gas at a cathode side in a fuel cell that uses hydrogen as a fuel gas, and a valve open amount calculation method for the fuel cell operation system.

The invention claimed is:

1. A fuel cell operation system, comprising:
a fuel cell;
a fuel gas supply device that supplies a fuel gas to an anode side of the fuel cell;
an oxidizing gas supply device that supplies an oxidizing gas to a cathode side of the fuel cell;
an inlet side flow path that connects between the oxidizing gas supply device and a cathode side gas inlet of the fuel cell;
an outlet side flow path connected from a cathode side gas outlet of the fuel cell to an exhaust side;
a bypass flow path that connects between the inlet side flow path and the outlet side flow path and is arranged in parallel with the fuel cell;
a control valve provided in at least one of the inlet side flow path and the outlet side flow path to adjust a gas flow rate at the cathode side;

a bypass valve provided in the bypass flow path to adjust a gas flow rate in the bypass flow path; and a control unit that controls operation of the fuel cell, wherein the control unit is programmed to:

obtain a bypass valve differential pressure which is a differential pressure between upstream and downstream of the bypass valve by applying an open amount of the bypass valve and the gas flow rate in the bypass flow path to pre-obtained flow characteristics of the bypass valve; and obtain an open amount of the control valve by applying the bypass valve differential pressure and the cathode side gas flow rate to both characteristics of pre-obtained cathode side flow characteristics of the fuel cell and flow characteristics of the control valve.

2. The fuel cell operation system according to claim 1, wherein:

the fuel gas is hydrogen; and the control unit further comprises:

an obtaining part to obtain a pumping hydrogen amount for the cathode side within the fuel cell based on an output power required of the fuel cell;

an obtaining part to obtain a gas flow rate at which gas is supplied to the cathode side gas inlet based on the output power required of the fuel cell; and an obtaining part to obtain a gas flow rate at which gas is passed through the bypass flow path based on the obtained pumping hydrogen amount.

3. The fuel cell operation system according to claim 2, wherein:

the control unit further comprises an obtaining part to obtain an unreacted hydrogen flow rate which is an unreacted fuel gas flow rate at the anode side; and the obtaining part to obtain a gas flow rate at which gas is passed through the bypass flow path comprises obtaining a gas flow rate at which gas is passed through the bypass flow path based on the pumping hydrogen amount and the unreacted hydrogen gas flow rate at the anode side.

4. The fuel cell operation system according to claim 2, wherein:

the control unit further comprises a correcting part to correct the open amount of the control valve based on a difference between an actual generated power output from the fuel cell which is operated under the obtained open amount of the control valve and the output power required of the fuel cell.

* * * * *